(No Model.) 3 Sheets—Sheet 2.
H. E. PRIDMORE.
GRAIN BINDER.
No. 601,609. Patented Mar. 29, 1898.
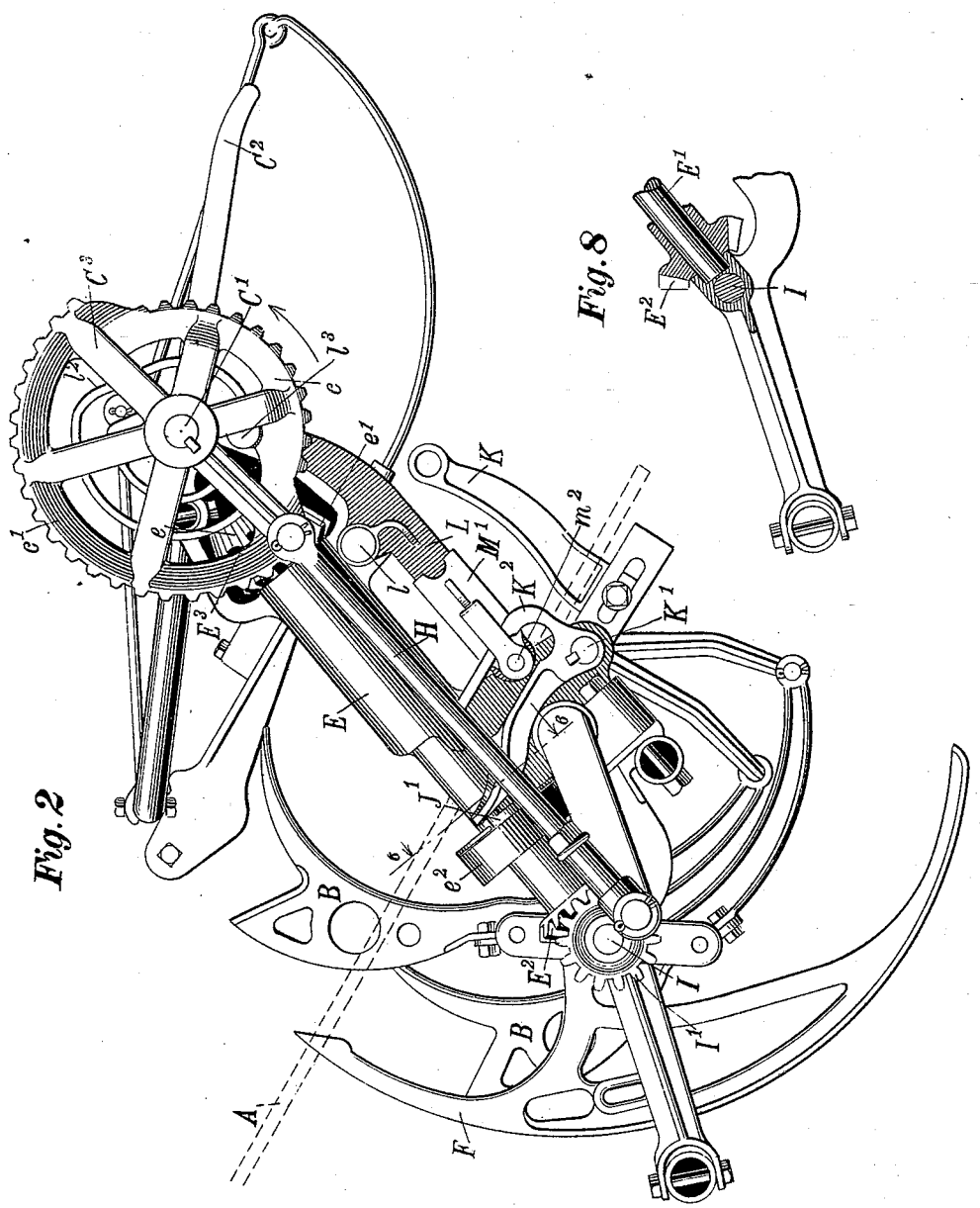
WITNESSES: John M. Culver. E. E. Clinton.
INVENTOR Henry E. Pridmore
BY R. B. Swift.
ATTORNEY.

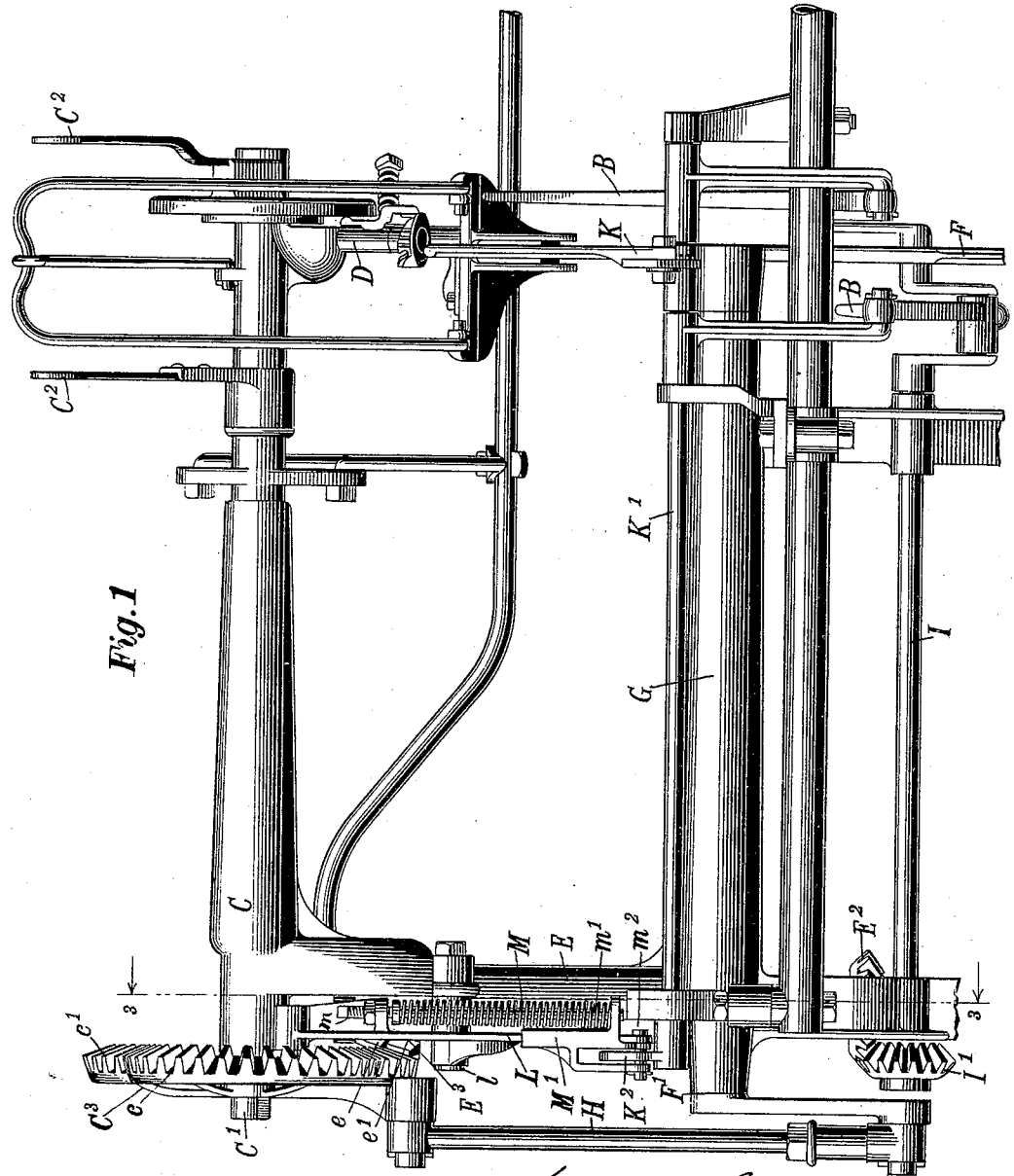

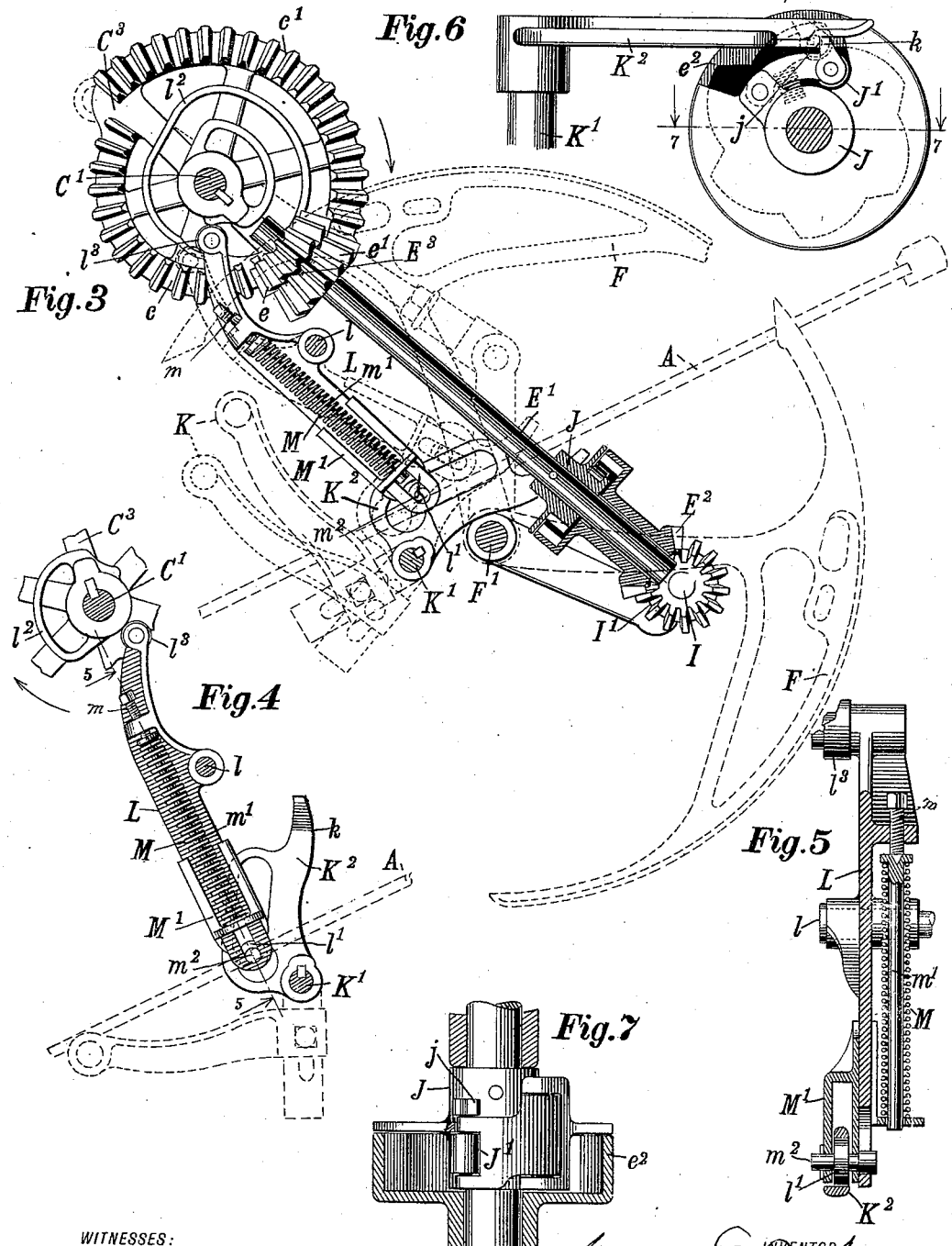

UNITED STATES PATENT OFFICE.

HENRY E. PRIDMORE, OF CHICAGO, ILLINOIS, ASSIGNOR TO THE McCORMICK HARVESTING MACHINE COMPANY.

GRAIN-BINDER.

SPECIFICATION forming part of Letters Patent No. 601,609, dated March 29, 1898.

Application filed July 3, 1895. Renewed February 23, 1898. Serial No. 671,329. (No model.)

*To all whom it may concern:*

Be it known that I, HENRY E. PRIDMORE, a citizen of the United States, residing at Chicago, in the county of Cook and State of Illinois, have invented certain new and useful Improvements in Grain-Binders, of which the following is a specification.

My improvement relates to certain new constructions to improve the operation of grain-binders and to simplify and make them more available for use and at the same time to give them a more tidy and symmetrical appearance. I have accomplished these objects in the manner which will be hereinafter described and have illustrated the grain-binder containing my improvements by drawings, in which—

Figure 1 is an elevation of the grain-binder from the discharge side, showing it separated from the harvester, to which it is understood it is to be attached in the usual manner for receiving grain. Fig. 2 is an end elevation from the gear end, the deck upon which the grain is to be received from the harvester being shown in broken lines. Fig. 3 is a sectional elevation on line 3 3 of Fig. 1, the binder-frame being removed, the needle and trip-finger being shown in broken lines, they being in front of the plane of the drawing, and a new position of the parts is shown in dotted lines. Fig. 4 is a view of the spring-link separate from the machine, showing its pivot to the frame of the binder and its connection to the trip, also the action of the cam upon it. Fig. 5 is a sectional view on the line 5 5 of Fig. 4. Fig. 6 is a top view of the clutch on the line 6 6 of Fig. 2, the trip-stop, which is above this line, being included in the view. Fig. 7 is a part sectional view on the line 7 7 of Fig. 6, the upright shaft and the trip-dog being in section, while Fig. 8 is a part sectional view of one of the binder-sills, showing the bearing therein for the transverse shaft.

Similar letters refer to similar parts throughout the several views.

The binding attachment upon which my improvements are placed is of the usual form of grain-binder and is attached to the delivery end of the harvester, so that the grain that is discharged from the elevators will fall upon the deck A (shown in dotted lines in Fig. 3) and thus fall within reach of the packers B, that alternate in their reciprocations through the deck A, bringing the grain into the bundle-receptacle of the machine.

In the horizontal member C of the ⌐-shaped binder-frame is mounted the shaft C', called the "knotter-shaft," which at the end of the arm supports and gives motion to the knotting mechanism D of the binder. I have shown this mechanism to be one form of the device patented by me. Still any well-known form of a knotter is applicable to this construction. The shaft C also carries the ejector-arms $C^2$, which are rotated by this shaft and act to eject the bundle after the same has been formed and bound. In the upright member E of the ⌐-shaped binder-frame is positioned the shaft E', which carries at its lower end the bevel-pinion $E^2$, loosely mounted upon the shaft, and at its upper end the bevel-pinion $E^3$, having the two rows of teeth $e\ e'$. These teeth mesh with teeth on the bevel-wheel $C^3$, which is keyed to the knotter-shaft C'. It will be noticed that the bevel-wheel $C^3$ has two segments of gear-teeth, the inner segment $c$ meshing with the row of teeth $e$ on the bevel-pinion $E^3$, while the outer segment $c'$ meshes with the row of teeth $e'$ on the bevel-wheel $E^3$. Motion transmitted to the upright shaft E' is thus transmitted to the knotter-shaft C', so that the speed of the shaft is increased while the inner segment is in mesh and decreased while the outer segment is in mesh; but the leverage exerted upon the devices on the shaft and the connections from the bevel-wheel is affected inversely—that is, the inner segment gives a greater speed but the smaller leverage and the outer segment the slower speed but the greater leverage.

The devices which automatically regulate the size of the bundle and which break the continuous movement of the parts and act in opposition to the needle as a compressor to compress the bundle will now be described. On the upright shaft E' it has been stated that the bevel-wheel $E^2$ is loosely mounted at its lower end and that this wheel meshed with the bevel-wheel I', that is fixed to the constantly-rotating packer-shaft I. This wheel $E^2$ has a flange $e^2$, the inner periphery of which is notched, as shown in Fig. 6, a top view of this part. On the upright shaft E' is keyed a hub J, to which is pivoted the trip-dog J', that is spring-pressed, as shown partly in dotted lines in Fig. 6, into the path of the notches on the bevel-wheel E². So long as this dog is not acted upon it remains as a coupling connection, thus imparting a constant motion to the parts of the binder beyond. The problem now is to so act upon this dog as to unclutch it when necessary and allow it to become clutched when sufficient grain has accumulated to form a bundle. This is accomplished in a peculiar and novel manner, for the purpose that will be hereinafter described.

In the path of the stream of grain, in about the same vertical plane as the needle F, is positioned the trip and compressor finger K. It is mounted on the shaft K', that is extended along practically parallel with the lower member of the binder-frame, on which it is supported, to the end of the binder. On this end of the shaft is keyed a trip-stop K², which is formed in a peculiar manner and controlled by means of the spring-link L, that is pivoted on the stud $l$, that is located on the upright member E of the binder-frame. In the lower end of this spring-link L is mounted a friction-roller $l'$, which works in an elongated slot formed in the trip-stop K². This roller $l'$ is for the purpose of reducing the friction of the parts as the spring-link L is swung on its pivot $l$ by the cam-track $l^2$ on the bevel-wheel C³. Another roller $l^3$ on the upper end of the spring-link L travels in this cam-track and reduces the friction that would follow were the contact a sliding one. An examination of the drawings in Fig. 4 will show how the rotation of the bevel-wheel C³ will swing the spring-link L on its pivot $l$, thus moving the lower end of the link through the slot in the trip-stop K². The trip-stop K² is located and vibrates in such a vertical plane in relation to the trip-dog J' as that when thrown down by the vibration of the spring-link L it will fall in the path of the trip-dog, thus forcing the trip-dog J' inwardly against its spring and away from the ratchets in the bevel-wheel E². The machine will thus be unclutched from its power. The shoulder $k$ on trip-stop K² forms a stop against which the projection $j$ on the trip-dog J' strikes in the rotation of the parts, and not only is the dog unclutched, but the parts are locked by means of the contact of these stops from further rotation. As thus far explained the machine would be clutched and unclutched; but the method of doing this and the connections for performing the operation so that they shall at the same time actuate these parts and perform the further office of compressing the bundle is also novel in this device and is a part of my improvement. Heretofore, so far as I am aware, it has been found necessary to use separate springs of different degrees of tension, one to give way before the force of the oncoming stream of grain and operate the clutch devices and the other a stronger spring to hold the trip and compressing finger in the path of the stream of grain after it has yielded for clutching and against the force of the uprising needle, so that the bundle may be forcibly compressed. In my invention I have dispensed with the use of one of these springs and make the same spring do the double work of, first, a light spring to give way for the tripping and then, being thrown into a new place with an increased leverage against the oncoming stream of grain, act as a compressor-spring. This result has been accomplished by placing in the spring-link L the spring M, one end of which is adjustably connected by means of the screw $m$ with the link, while the other rests upon and is supported by the sliding block M'. A spring-rod $m'$ holds the spring in position, the lower end of it passing freely through the sliding block M'. The limit of movement of this sliding block M' is on the link formed by the stud of the roller of the trip-stop $m^2$, passing through the block and into the slot of the link L.

When the parts are in normal position, as shown in Fig. 2, pressure exerted upon the trip-finger will tend to lift the sliding block M' on the spring-link L and compress the spring M. The spring will thus hold the trip-stop K² with some force in the path of the trip-dog J' and the members remain unclutched. Attention is called to the fact that the action of the spring-link L is in this position close to the pivot of the trip and compressor shaft, and the force of the stream of grain on the trip-finger K thus has a large leverage to overcome the strength of the spring. When, however, the needle F is raised, the cam-wheel C³ throws the lower end of the spring-link L farther from the pivot of the trip-shaft along the slot of the trip-stop K², and the spring has thus more leverage to withstand the force applied to the trip and compressing finger K. One spring thus performs the double office, because in its different positions it has an increased or diminished leverage upon the parts. When, however, the needle F has encircled the gavel and the bundle is bound, the cam-track $l^2$ on the bevel-wheel C³ is given a rapid deflection and the force of the bundle throws the trip and compressor finger K out of the path of discharge and the parts take the position shown in Fig. 4.

Attention is particularly called to the fact that the force of the compacted grain upon the trip-finger K is resisted by the stud $l$ of the spring-link L on the binder-frame. This is a novel and exceedingly useful result. So far as applicant is aware it has been the custom to resist the force of the compressor-finger almost wholly upon the cam-track, thus causing great friction and an unusual wear of the parts. A line drawn through the centers of the rollers upon the extremities of the spring-link L will show that the stud $l$, upon which the link is pivoted, is located but a short distance from this line and that therefore a great part of the strain of the operation is thrown upon the stud $l$. The roller $l^3$ on the spring-link that is within the path of the cam-track $l^2$ of the bevel-wheel $C^3$ controls the spring-link L, and at the time of the greatest compression it will be noticed that the roller $l'$ on the spring-link L is thrown into the extremity of the slot in the trip-stop $K^2$, and thus resists the force, so that it is largely thrown upon the stud $l$.

The grain delivered from the elevators of the harvester falls upon the deck A of the binder within reach of the packers B, which in their reciprocations take it wisp by wisp and forward it into the binding-chamber, the outlet of which is stopped by the trip-finger K, the deck A forming the lower wall and the knotter D and its attached parts forming the upper wall. The grain is filled into this receptacle until a sufficient quantity has accumulated and until it has become sufficiently packed so that the force of the packer will be transmitted through it to the trip-finger K, which will yield against the force of the spring M in the extensible lever L, thus lifting the trip-stop $K^2$, when the trip-dog $J'$ enters a ratchet in the bevel-wheel $E^2$ and clutches the binding, tying, and discharging devices to the power. The trip-stop $K^2$ is, by means of the cam-track $l^2$ and extensible lever L, controlled so that it does not enter the path of the trip-dog $J'$ until the bundle has been bound and discharged and the needle returned to its normal position, at which instant it strikes within the path of the trip-dog $J'$ and forces it out of the ratchet on the bevel-wheel $E^2$. The parts then come to rest, the grain is forwarded into the receptacle by the packers, and the operation repeated as often as the accumulated grain is of such resistance as to impart the motion of the packer to clutch the mechanism.

The trip-finger K performs the double office of a trip and a compressor in the construction shown in the drawings and thus far described. It is evident, however, that the binder could be unclutched and the tripping mechanism controlled by other well-known means, thus leaving the finger K, its shaft, and the slotted arm $K^2$, with the extensible link and the cam which vibrates it, to perform the office of a compressor and to positively get the compressor out of the way when the bundle is being discharged and back again ready for the next bundle. The combining of the offices of trip and compressor, however, greatly simplifies the binder cheapens its construction, and makes it more available for use on the farm.

In the description of the device so far given the upright shaft $E'$ has been specified as being mounted in the upright member E of the binder-frame. It is plain that it could be mounted in bearings connected to this upright member and still be so situated as to make possible the arrangement of the tripping device and the combination of the trip and compressing devices into one member and still have them act, as has been described.

Having now described my invention, what I claim is—

1. In a grain-binder in combination, substantially as hereinbefore set forth, a trip-finger and its rock-shaft, a trip-stop keyed to the rock-shaft, which stop has an elongated slot, an extensible lever pivoted to the binder-frame one end of which has a bearing in the elongated slot in the trip-stop, while the other extends into the path of a cam on the knotter-shaft.

2. In combination in a grain-binder, a trip-finger and its shaft, a trip-stop keyed to the trip-shaft, an extensible lever pivoted to the machine and acting upon the trip-stop practically in a line with the stress thrown upon the trip-stop by the incoming grain acting upon the trip-finger and its shaft, means on the machine to change the position of the extensible lever farther from the center of the trip-stop, whereby the leverage is increased during the binding operation, and to throw it toward the center of the trip-stop, to allow the discharge of the bundle, substantially as and for the purpose specified.

3. In a grain-binder in combination with the trip-finger, a spring acting upon the trip-finger with a yielding force and at such a short leverage as to be readily overcome by the stress of the incoming grain, and means to change the leverage of the spring upon the trip-finger so that its action shall be more advantageous during the time of the compressing of the bundle.

4. In combination with a trip and compressor finger of an automatic binder, a spring acting upon the trip and compressor finger with a yielding force and with a slight leverage during the accumulation of the bundle, and means whereby the position of the spring is changed during the compression of the bundle to a point where its leverage is increased.

5. In combination in an automatic binder, a trip-finger and its shaft, an extensible lever in which a spring is positioned pivoted to the frame of the machine practically in a line with the force that is transmitted to the extensible lever from the trip-shaft, a sliding connection between the extensible lever and the trip-shaft with means whereby the extensible lever is rocked on its pivot.

6. In combination in a grain-binder with a compressor-finger and its shaft, an arm fixed on the compressor-shaft, an extensible lever pivoted to the machine one end of which is connected with the arm fixed to the compressor-shaft by a sliding connection while the other end is extended into the path of a cam, the extensible lever being formed of a sliding member against which the spring presses, and means for adjusting the tension of the spring.

7. In a grain-binder in combination, a trip and compressor finger closing the exit from the binder, a trip-stop rigidly connected with the trip and compressor finger shaft, a spring acting upon the trip-stop to hold it within the path of a trip-dog, and automatic means for changing the force of the spring upon the trip and compressor finger during the operation of tying and discharging the bundle.

8. In combination in a grain-binder, a compressor and its shaft, an arm keyed to the shaft its position while the bundle is being formed and tied being practically at right angles to the upright member of the binder-frame, an extensible lever pivoted to the binder-frame practically parallel with its upright member, the lower end of the extensible lever having a sliding connection with the arm connected to the compressor-shaft, the upper arm of the extensible lever being continued into the path of a cam, whereby the strain brought upon the compressor-finger during the time of forming and binding a bundle is largely transmitted to the pivot of the extensible lever on the binder-frame.

9. In combination in an automatic grain-binder, a trip and compressor finger closing the discharge side of the binder, a shaft upon which this trip and compressor finger is mounted, an arm keyed to the trip and compressor finger shaft, an elongated slot in this arm, an extensible lever pivoted to the binder-frame one arm of which slides in this elongated slot and the other arm of which extends into the path of a cam, the elongated slot in the arm keyed to the trip and compressor shaft having its elongation both ways from the position of the extensible lever while the binder is receiving a bundle, whereby the movement of the cam upon the extensible lever will vibrate the end in the elongated slot in one direction to increase the leverage of the extensible lever upon the trip and compressor and in the other direction to drop the trip and compressor finger from its position while the bundle is being discharged.

HENRY E. PRIDMORE.

Witnesses:
R. B. SWIFT,
JOHN M. CULVER.